Figure 1:
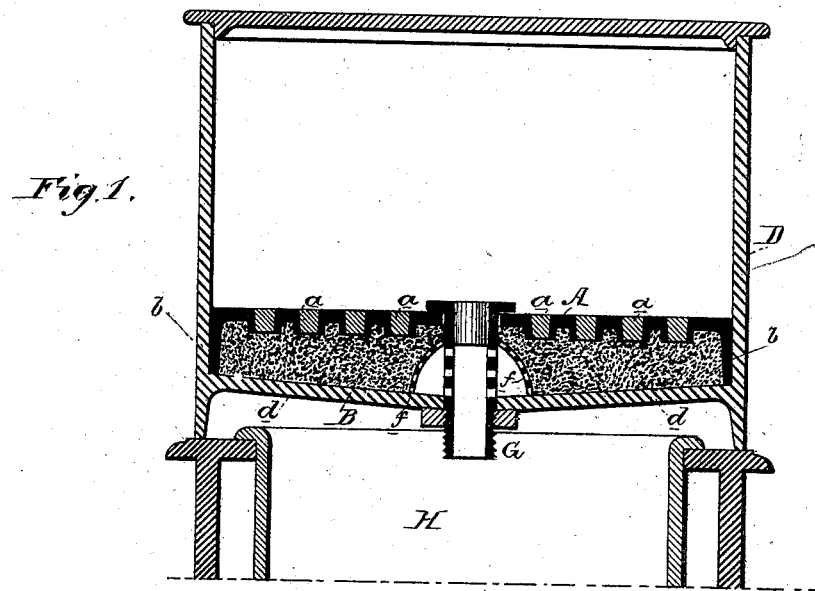
Figure 2:
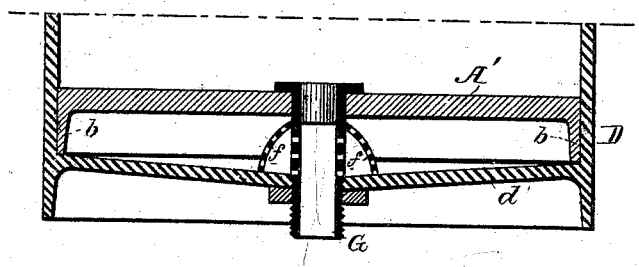

C. C. SAVERY.
Filters.

No. 139,922. Patented June 17, 1873.

Witnesses,
Harry Smith
Thomas McIlvain

Charles C. Savery
by his Att'ys
Howson and Son

UNITED STATES PATENT OFFICE.

CHARLES C. SAVERY, OF PHILADELPHIA, PENNSYLVANIA.

IMPROVEMENT IN FILTERS.

Specification forming part of Letters Patent No. 139,922, dated June 17, 1873; application filed December 12, 1872.

*To all whom it may concern:*

Be it known that I, CHARLES C. SAVERY, of Philadelphia, Pennsylvania, have invented certain Improvements in Filters, of which the following is a specification:

My invention relates to improvements in filters; and consists in constructing the same as described hereafter, so as to reduce the cost of their manufacture and increase their efficiency.

The casing D of the filter is preferably of cast-iron, enameled internally, and contains a mass, B, of charcoal or equivalent filtering substance, above which is a straining plate or block, A. This straining block or medium A may be of porous stone or baked clay; but I prefer to use a plate of enameled cast-iron, and having openings, $a$, packed with material which is partly vitrified during the enameling of the plate, as described in my application for a patent allowed October 31, 1872, this material being porous and serving to separate all foreign particles held in suspension in the water. The straining-plate A has a flange, $b$, resting on the bottom $d$ of the casing D, and is confined to the latter so as to prevent any displacement of the plate by a central tubular bolt, G, the space between the bottom $d$ of the casing and the straining-plate being packed with charcoal or other equivalent filtering and purifying material. Within the space between the straining-plate and the bottom $d$ of the casing the tubular bolt G is perforated with small holes, and these holes are protected by a shield, $f$, of wire gauze or its equivalent, so that the water, after percolating through the strainer A and filtering medium B, may pass laterally through the meshes of the shield $f$, and through the perforations in the tubular bolt, and thence into the water-cooler H below.

When the filter is not used in connection with the water-cooler, an ordinary outlet-cock may be applied to the side near the bottom of the filter for the escape of the filtered water. As the fluid traverses the mass of charcoal laterally, it parts more readily with any impurities and is more thoroughly filtered than if it passed vertically through the filtering medium as usual.

I claim as my invention—

1. The straining-plate A, having a flange, $b$, and adapted to the vessel D, in combination with the body of filtering material retained between the plate and bottom of the vessel, as set forth.

2. The combination of the horizontal straining-plate A, adapted to the vessel, as set forth, and a central delivery-tube, as and for the purpose specified.

3. The combination, with the vessel D and straining-plate A, of a perforated tubular bolt G, securing the plate and serving as an outlet for the filtered water, as specified.

In testimony whereof I have signed my name to this specification in the presence of two subscribing witnesses.

CHARLES C. SAVERY.

Witnesses:
WM. A. STEEL,
HUBERT HOWSON.